US009651656B2

(12) United States Patent
Hall et al.

(10) Patent No.: US 9,651,656 B2
(45) Date of Patent: May 16, 2017

(54) REAL-TIME LOCATION SYSTEM IN WIRELESS SENSOR NETWORK

(71) Applicants: Stewart E. Hall, Wellington, FL (US); Hap Patterson, Boca Raton, FL (US); Robert F. Brewin, San Diego, CA (US)

(72) Inventors: Stewart E. Hall, Wellington, FL (US); Hap Patterson, Boca Raton, FL (US); Robert F. Brewin, San Diego, CA (US)

(73) Assignee: Tyco Fire & Security GmbH, Neuhausen am Rheinfall ( * ) Notice: Subject to any disclaimer, the term of this patent is extended or adjusted under 35 U.S.C. 154(b) by 0 days.

(21) Appl. No.: 14/464,010

(22) Filed: Aug. 20, 2014

(65) Prior Publication Data

US 2015/0285896 A1    Oct. 8, 2015

Related U.S. Application Data

(60) Provisional application No. 61/973,962, filed on Apr. 2, 2014, provisional application No. 61/946,054, filed on Feb. 28, 2014.

(51) Int. Cl.
*G01S 5/02* (2010.01)
*G08B 25/10* (2006.01)
(Continued)

(52) U.S. Cl.
CPC ............ *G01S 5/0294* (2013.01); *G01S 5/02* (2013.01); *G01S 5/0236* (2013.01);
(Continued)

(58) Field of Classification Search
CPC ............ G06Q 10/0833; G07C 9/00111; G01S 5/0294; G01S 5/24; G01S 5/26;
(Continued)

(56) References Cited

U.S. PATENT DOCUMENTS 6,838,992 B2    1/2005  Tenarvitz
7,212,563 B2    5/2007  Boyd et al
(Continued)

FOREIGN PATENT DOCUMENTS

WO    WO 01/06401       1/2001
WO    WO 2013/159217   10/2013

OTHER PUBLICATIONS

International Search Report and Written Opinion, PCT/US15/17680.
International Search Report and Written Opinion, PCT/US15/17702.
International Search Report and Written Opinion PCTUS1517477.

*Primary Examiner* — Hung T Nguyen
(74) *Attorney, Agent, or Firm* — Fish & Richardson P.C.

(57) ABSTRACT

A real-time location and tracking system includes location markers programmed with location information of the locations that the location markers are affixed to and a mobile RTLS tracking system to read location information from nearby location markers and a mobile RTLS monitoring and display system. The system is configured to receive signals from the mobile RTLS tracking system that includes a microprocessor and memory that control the functionality of the mobile RTLS monitoring and display system to display status and geo coordinates of the mobile RTLS tracking system.

19 Claims, 11 Drawing Sheets

(51) Int. Cl.
*G06N 5/02* (2006.01)
*H04L 29/08* (2006.01)
*H04W 84/18* (2009.01)
*G08B 7/06* (2006.01)
*G08B 13/00* (2006.01)
*G08B 13/196* (2006.01)
*H04N 7/18* (2006.01)
*G08B 13/22* (2006.01)
*G08B 13/24* (2006.01)
*H04L 12/741* (2013.01)
*H04W 88/16* (2009.01)
*G06K 9/00* (2006.01)
*H04W 4/00* (2009.01)
*H04W 4/02* (2009.01)

(52) U.S. Cl.
CPC .............. *G01S 5/0284* (2013.01); *G06K 9/00* (2013.01); *G06N 5/027* (2013.01); *G08B 7/062* (2013.01); *G08B 13/00* (2013.01); *G08B 13/19613* (2013.01); *G08B 13/22* (2013.01); *G08B 13/2491* (2013.01); *G08B 25/10* (2013.01); *H04L 45/74* (2013.01); *H04L 67/10* (2013.01); *H04N 7/181* (2013.01); *H04W 4/008* (2013.01); *H04W 4/028* (2013.01); *H04W 84/18* (2013.01); *H04W 88/16* (2013.01); *H04W 4/02* (2013.01)

(58) Field of Classification Search
CPC .. G01S 5/28; G01S 5/30; G08B 25/10; G08B 25/009; G08B 21/0269; G08B 21/0272; G08B 13/00; G08B 13/1961; G06F 17/30; G06F 17/30876; G06F 17/30879
USPC ............ 340/539.13, 539.11, 825.69, 825.72, 340/573.1; 235/375, 492, 487, 376
See application file for complete search history.

(56) References Cited

U.S. PATENT DOCUMENTS

| | | | |
|---|---|---|---|
| 7,365,645 B2 * | 4/2008 | Heinze | G06K 17/00 340/539.13 |
| 7,545,326 B2 | 6/2009 | Caliri et al. | |
| 7,564,357 B2 | 7/2009 | Baranowski et al. | |
| 7,636,046 B2 | 12/2009 | Caliri et al. | |
| 7,705,736 B1 * | 4/2010 | Kedziora | A01K 11/008 340/573.3 |
| 7,884,712 B2 | 2/2011 | Nierenberg et al. | |
| 7,899,006 B2 | 3/2011 | Boyd | |
| 7,916,026 B2 | 3/2011 | Johnson et al. | |
| 7,956,746 B2 | 6/2011 | Truscott et al. | |
| 8,009,034 B2 | 8/2011 | Dobson et al. | |
| 8,310,364 B2 | 11/2012 | Derks et al. | |
| 8,311,558 B2 | 11/2012 | Davidson et al. | |
| 8,319,635 B2 | 11/2012 | Perkins et al. | |
| 8,390,442 B2 | 3/2013 | Burns et al. | |
| 8,428,550 B2 | 4/2013 | Larsen | |
| 8,457,656 B2 | 6/2013 | Perkins et al. | |
| 8,463,619 B2 | 6/2013 | Scarola | |
| 8,502,670 B2 | 8/2013 | Cha et al. | |
| 8,599,011 B2 | 12/2013 | Schantz et al. | |
| 8,633,803 B2 | 1/2014 | Mo et al. | |
| 8,659,420 B2 | 2/2014 | Salvat, Jr. | |
| 8,682,541 B2 | 3/2014 | Best et al. | |
| 8,686,851 B2 | 4/2014 | Davis | |
| 8,694,275 B2 | 4/2014 | Wang et al. | |
| 8,725,175 B2 | 5/2014 | Altman et al. | |
| 8,727,225 B2 | 5/2014 | Zumsteg et al. | |
| 8,742,908 B2 | 6/2014 | Boudy | |
| 2007/0226314 A1 * | 9/2007 | Eick | G06F 17/30896 709/217 |
| 2007/0239350 A1 | 10/2007 | Zumsteg et al. | |
| 2008/0068267 A1 | 3/2008 | Huseth et al. | |
| 2008/0297346 A1 * | 12/2008 | Brackmann | B60P 3/03 340/572.1 |
| 2009/0174547 A1 * | 7/2009 | Greene | A62B 99/00 340/539.13 |
| 2010/0295943 A1 * | 11/2010 | Cha | G01S 13/82 348/143 |
| 2011/0051656 A1 | 3/2011 | Hethuin et al. | |
| 2011/0298619 A1 * | 12/2011 | O'Hare | A01K 11/008 340/573.1 |
| 2011/0310791 A1 | 12/2011 | Prakash et al. | |
| 2013/0003645 A1 | 1/2013 | Shapira et al. | |
| 2013/0064233 A1 | 3/2013 | Hethuin et al. | |
| 2013/0079028 A1 | 3/2013 | Klein | |
| 2014/0006165 A1 * | 1/2014 | Grigg | G06Q 30/0207 705/14.64 |
| 2014/0203071 A1 * | 7/2014 | Eggert | G06F 17/3089 235/375 |
| 2014/0231502 A1 * | 8/2014 | Marsico | G06Q 30/0203 235/375 |

* cited by examiner

REAL-TIME LOCATION SYSTEM IN WIRELESS SENSOR NETWORK

CLAIM OF PRIORITY

This application claims priority under 35 U.S.C. §119(e) to provisional U.S. Patent Application 61/973,962, filed on Apr. 2, 2014, entitled: "Wireless Sensor Network", and provisional U.S. Patent Application 61/946,054, filed on Feb. 28, 2014, entitled: "Wireless Sensor Network", the entire contents of which are hereby incorporated by reference.

REAL-TIME LOCATION SYSTEM IN WIRELESS SENSOR NETWORK

This description relates to operation of security systems in particular intrusion systems.

BACKGROUND

This description relates to operation of security systems in particular physical intrusion and alarm systems installed on commercial or residential premises.

It is common for businesses and homeowners to have a security system for detecting alarm conditions at their premises and signaling the conditions to a monitoring station or to authorized users of the security system. Sensors types typically include motion detectors, cameras, and proximity sensors (used to determine whether a door or window has been opened). One particular type of sensor is a badge or tag reader to track movement of an credentialed individual within a premises, such as in a major commercial or industrial facility.

Real-time location systems (RTLS) use an active system to determine the current location of a moving tag within an environment. Different systems use different technologies to determine the location, but such systems typically use either distance measurement or angle measurement (or a combination of the two) between two or more elements in the system with known locations (e.g., locating elements) and the element in the system that is being located (e.g., a tag).

SUMMARY

Several problems limit the efficacy of real-time location systems (RTLS). A traditional RTLS system depends on having accurate position information for each of the locating elements. These locating elements either need to be fixed at an a priori known location or if they are portable elements, the elements location needs top be accurately determined at setup time. GPS is often used to determine the location of portable locating elements. However that is only possible in locations where GPS is functional and accurate (i.e. outdoors without obstructions).

The difficulty of setting up and determining the position the locating elements requires a person who is highly trained in the use of the system and takes a significant amount of time to deploy. The distance between the Locating Elements and the Tag is limited by a number of factors depending on the technology that is used. For line of sight systems such as laser based ranging systems, there can be no obstructions. Even for systems that can penetrate obstructions such as those using Radiating Electromagnetic energy (RF), obstructions decrease the range of these applications. The accuracy of the tag location is often compromised by a phenomenon called multipath which causes reflected signals to be picked up by the receiver which interfere with the signal enough to cause a decrease in the accuracy of the calculated location or make the location completely inaccurate. The location information that is received by the system is typically provided in geographic coordinates. To use this location information, a system translates these coordinates into a location on a map or floor plan of a building such as "on the second floor near the north stairwell of the town hall building."

According to an aspect, a real-time location system a real-time location system includes a plurality of location markers programmed with location information of the locations that the location markers are affixed to around a site, a mobile tracking system to read location information from nearby location markers that are placed around the site, a mobile monitoring and display system, the mobile monitoring and display system is configured to receive signals from the mobile tracking system. The mobile monitoring and display system includes a microprocessor and memory which control the functionality of the mobile monitoring and display system to display status and geo coordinates of the mobile tracking system.

The following are some embodiments within the scope of the above aspect.

The real-time location system includes a positioning transceiver system, configured to determine the position of the positioning transceiver system relative to a global coordinate system during set up. The real-time location system includes a tag transceiver with location marker programmer to determine the location of the tag transceiver relative to global position coordinates and to program the plurality of location markers with the location information. The location markers are read by the mobile tracking system, and the mobile tracking system produces for a location marker, a record of the time that the location marker was read and the geo coordinate information and/or the user-friendly location name on the location marker.

The positioning transceiver system elements are placed throughout the site. The location information is geo coordinate information and/or user-friendly location information. The location markers include circuitry including a processor and memory that controls location marker and is configured to be programmed with geo coordinates and/or the friendly location information, and an antenna for the communication of location information. The mobile tracking system further includes a location marker reader that reads information from location markers during tracking phase of operation, an antenna that facilitates communication with the location markers, and circuitry including a microprocessor and memory that controls the operation of the mobile tracking system. The positioning transceiver system further includes a positioning element that is used to determine the distance or angle to the traditional tag, a global positioning transceiver, and circuitry including a microprocessor and memory subsystem to control the positioning transceiver system and for communication of data to a tagging transceiver with location marker programmer. The tag transceiver with location marker programmer further includes a tag to determine the location of the tag transceiver with location marker programmer relative to the global position coordinates, and a location marker programmer to program location markers with the coordinates and user-friendly location information.

According to an additional aspect, a real-time location system includes a positioning transceiver system, configured to determine the position of the positioning transceiver system relative to a global coordinate system, a plurality of location markers programmed with location information of the locations that the location markers are affixed to around a site, a tag transceiver with location marker programmer to determine the location of the tag transceiver relative to global position coordinates and to program the plurality of location markers with the location information, a mobile tracking system to read location information from nearby location markers that are placed around the site, and a mobile monitoring and display system. The system is configured to receive signals from the mobile tracking system; and includes a microprocessor and memory which control the functionality of the system to display status and geo coordinates of the mobile tracking system.

The following are some embodiments within the scope of the above aspect.

The location markers are read by the mobile tracking system, and the mobile tracking system produces for a location marker, a record of the time that the location marker was read and the geo coordinate information and/or the user-friendly location name on the location marker. The location information is geo coordinate information and/or user-friendly location information.

According to an additional aspect, a method of real-time location tracking includes deploying a plurality of location markers that are programmed with location information of the locations that the location markers are affixed to around a site, deploying a mobile tracking system to read location information from nearby location markers that are placed around the site, receiving by a mobile monitoring and display system signals from the mobile tracking system to display status and geo coordinates of the mobile tracking system.

The disclosed real-time location system resolves or mitigates these issues by changing the way the system is deployed and decoupling the setup process from the tag location finding process.

The details of one or more embodiments of the invention are set forth in the accompanying drawings and the description below. Other features, objects, and advantages of the invention is apparent from the description and drawings, and from the claims.

DETAILED DESCRIPTION

Described herein are examples of network features that may be used in various contexts including, but not limited to, security/intrusion and alarm systems. Example security systems may include an intrusion detection panel that is electrically or wirelessly connected to a variety of sensors. Those sensors types may include motion detectors, cameras, and proximity sensors (used, e.g., to determine whether a door or window has been opened). Typically, such systems receive a relatively simple signal (electrically open or closed) from one or more of these sensors to indicate that a particular condition being monitored has changed or become unsecure.

For example, typical intrusion systems can be set-up to monitor entry doors in a building. When a door is secured, a proximity sensor senses a magnetic contact and produces an electrically closed circuit. When the door is opened, the proximity sensor opens the circuit, and sends a signal to the panel indicating that an alarm condition has occurred (e.g., an opened entry door).

Data collection systems are becoming more common in some applications, such as home safety monitoring. Data collection systems employ wireless sensor networks and wireless devices, and may include remote server-based monitoring and report generation. As described in more detail below, wireless sensor networks generally use a combination of wired and wireless links between computing devices, with wireless links usually used for the lowest level connections (e.g., end-node device to hub/gateway). In an example network, the edge (wirelessly-connected) tier of the network is comprised of resource-constrained devices with specific functions. These devices may have a small-to-moderate amount of processing power and memory, and may be battery powered, thus requiring that they conserve energy by spending much of their time in sleep mode. A typical model is one where the edge devices generally form a single wireless network in which each end-node communicates directly with its parent node in a hub-and-spoke-style architecture. The parent node may be, e.g., an access point on a gateway or a sub-coordinator which is, in turn, connected to the access point or another sub-coordinator.

Figure 1:
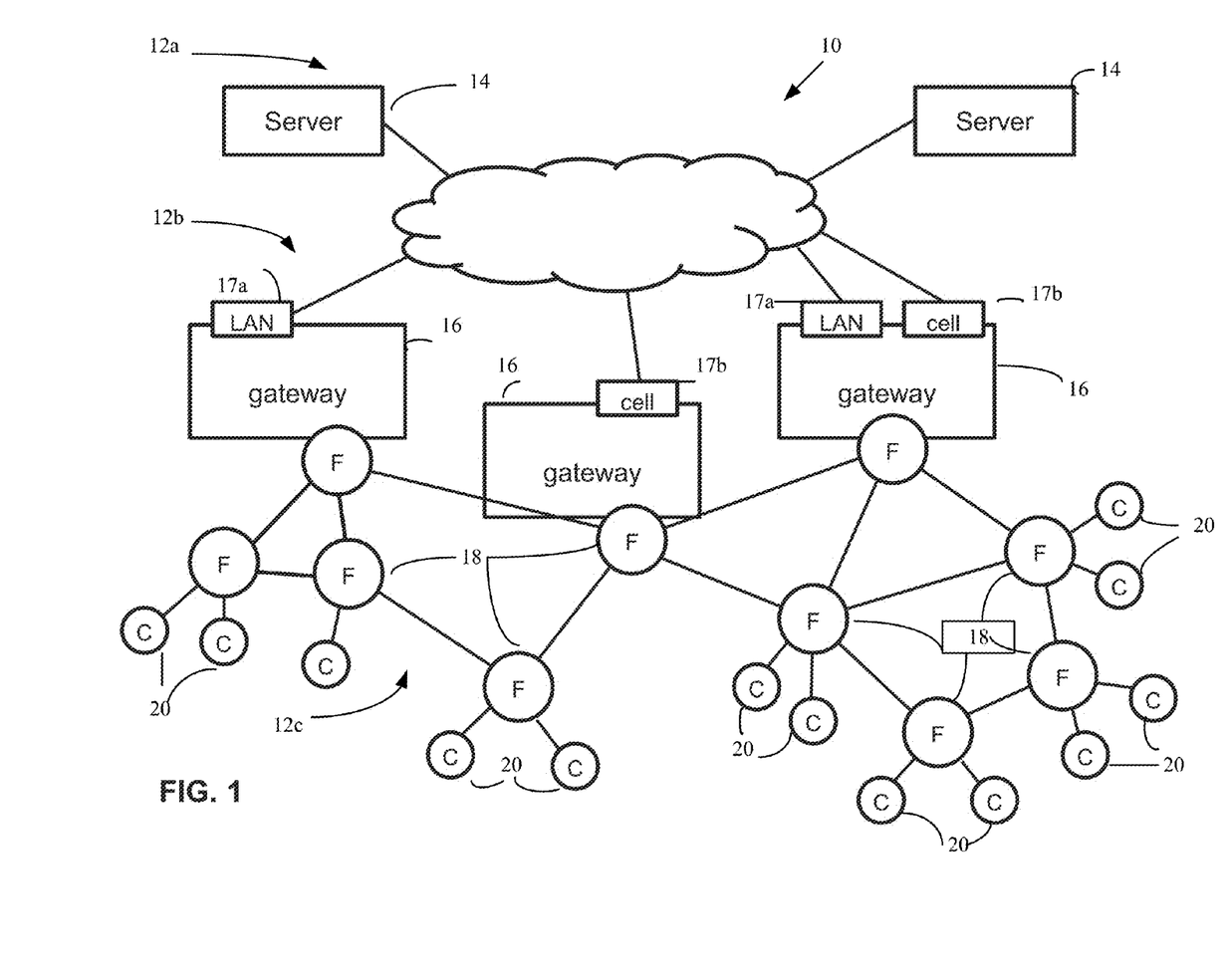
FIG. 1 is a schematic diagram of an exemplary networked security system.

Referring now to FIG. 1, an exemplary (global) distributed network topology for a Wireless Sensor Network (WSN) is shown. In FIG. 1 the distributed network 10 is logically divided into a set of tiers or hierarchical levels 12a-12c.

The global distributed network topology for the sensor network includes distributed rule engines denoted by the circle element "R" at individual nodes or collections of nodes. In an upper tier or hierarchical level 12a of the network are disposed servers and/or virtual servers 14 running a "cloud computing" paradigm that are networked together using well-established networking technology such as Internet protocols or which can be private networks that use none or part of the Internet. Applications that run on those servers 14 communicate using various protocols such as for Web Internet networks XML/SOAP, RESTful web service, and other application layer technologies such as HTTP and ATOM. The distributed network 10 has direct links between devices (nodes) as shown and discussed below.

The distributed network 10 includes a second logically divided tier or hierarchical level 12b, referred to here as a middle tier that involves gateways 16 located at central, convenient places inside individual buildings and structures. These gateways 16 communicate with servers 14 in the upper tier whether the servers are stand-alone dedicated servers and/or cloud based servers running cloud applications using web programming techniques. The middle tier gateways 16 are also shown with both local area network 17a (e.g., Ethernet or 802.11) and cellular network interfaces 17b.

The distributed network topology also includes a lower tier (edge layer) 12c set of devices that involve fully-functional sensor nodes 18 (e.g., sensor nodes that include wireless devices, e.g., transceivers or at least transmitters, which in FIG. 1 are marked in with an "F") as well as constrained wireless sensor nodes or sensor end-nodes 20 (marked in the FIG. 1 with "C"). In some embodiments wired sensors (not shown) can be included in aspects of the distributed network 10.

Real-Time Location System

Figure 2:
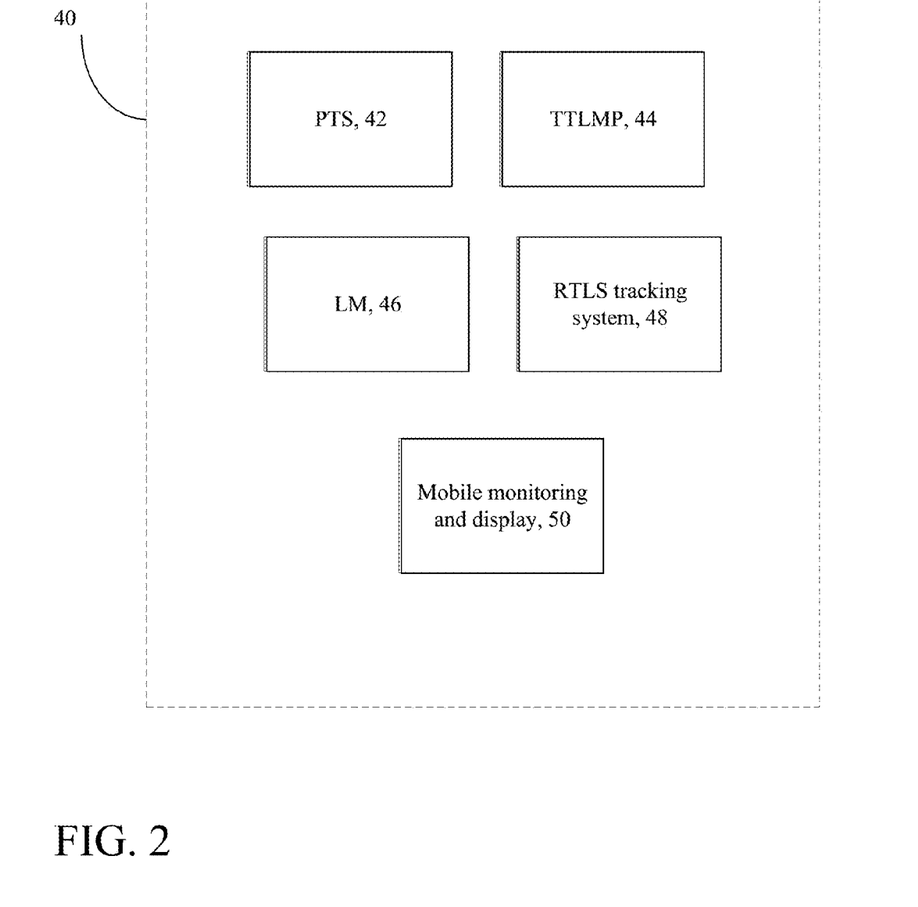
FIG. 2 is a block diagram of a real-time location system.

Referring now to FIG. 2, a real-time location system 40 using stationary, wireless sensor nodes and a portable transceiver is described. The system 40 includes a positioning transceiver system (PTS) 42, a tag transceiver with location marker programmer (TTLMP) 44, a location marker (LM) 46, a mobile tracking system 48 and a mobile monitoring and display system 50.

Figure 3:
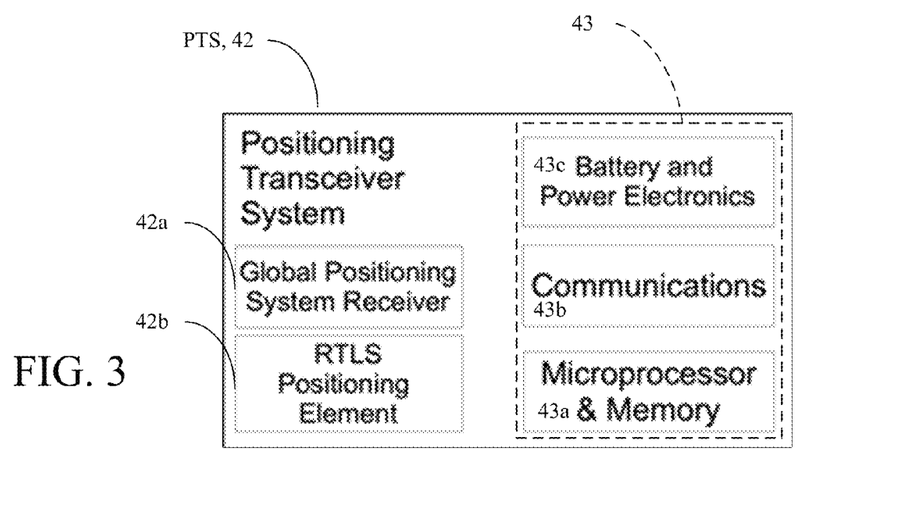
FIGS. 3-7 are block diagrams of components of the real-time location system of FIG. 2.

Referring to FIG. 3, the positioning transceiver system 42 includes a subsystem 42a that determines the position of the positioning transceiver system 42 relative to a global coordinate system such as latitude and longitude. An example of such a system would be a GPS receiver. The PTS 42 also includes a traditional positioning element 42b that is used to determine the distance or angle to the traditional tag. The system 42 also includes circuitry 43 including a microprocessor and memory subsystem 43a that is used to control the elements of the positioning transceiver system 42, (as well as a Battery and Power Electronics subsystem 43c that supplies power to the system during operation and a communications subsystem 43b that provides data and time synchronization between the various other Positioning Transceiver Systems (not shown), as well as communication of data to the Tagging Transceiver with Location Marker Programmer 44.

Figure 4:
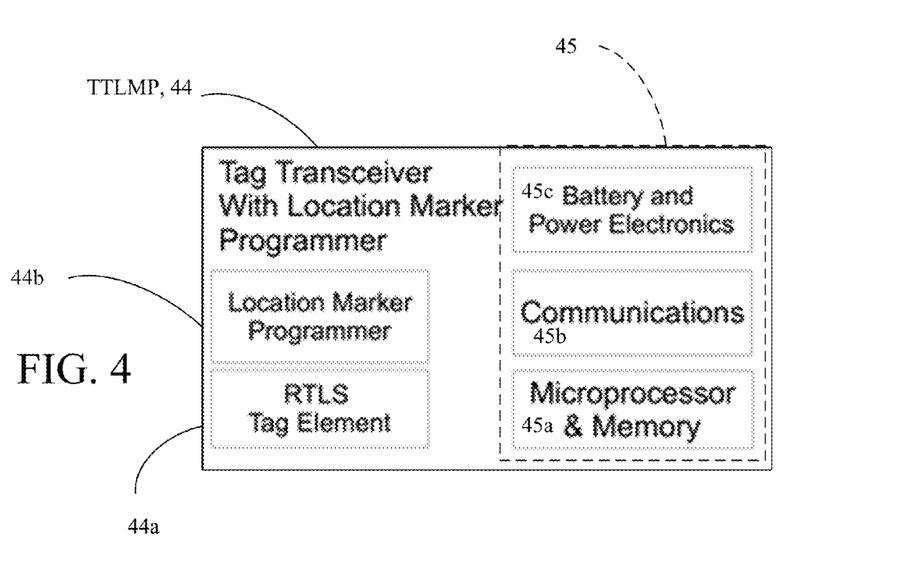

Referring to FIG. 4, the tag transceiver with location marker programmer 44 includes an Tag Element 44a that together with the Positioning Elements 42b (FIG. 3) are used to determine the location of the tag transceiver with location marker programmer 44 relative to the global position coordinates, a Location Marker Programmer 44b that is used to program a location marker with the coordinates and user-friendly location information. The tag transceiver with location marker programmer 44 also includes circuitry 45 including microprocessor and memory subsystem 45a (as well as a Battery and Power Electronics subsystem 45c) and a communications subsystem 45b that is used to control the elements of the Tag Transceiver 44a and Location Marker Programmer 44b, supply power to the Tag Transceiver 44a and Location Marker Programmer 44b during operation with the communications subsystem providing data and time synchronization between various Positioning Transceiver Systems.

Figure 5:
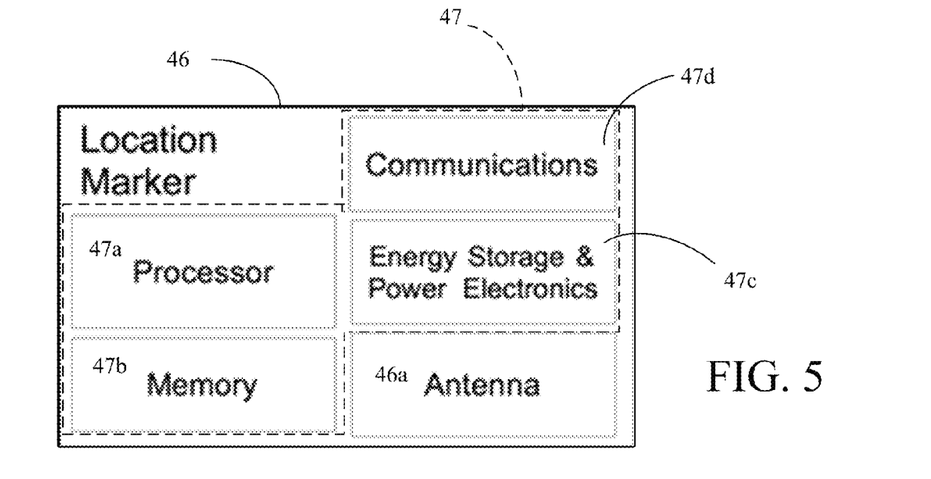

Referring to FIG. 5, the Location Marker 46 is shown. The location marker 46 is a low cost element that is programmed with geo coordinates of the location that the location marker 46 will be affixed to and/or a user-friendly location (e.g., a user supplied name) by the tag transceiver with location marker programmer 44b (FIG. 4). The location marker 46 includes circuitry 47 including a processor 47a that controls functionality of the location marker 46 and memory 47b that can be programmed with the geo coordinates and/or the friendly location information by the Tag Transceiver with Location Marker Programmer 46 and a communications block 47d that communicates with the Tag Transceiver with Location Marker Programmer 46.

Also included in the location marker 46 is an antenna 46a for the communication block 47d. The antenna 46a can be configured to provide different sensitivity patterns to allow for directional reading. The location marker 46 also includes an energy Storage and Power Electronics module 47c that provides power to the system during operation. The Location marker 46 may be either powered with an internal battery, an external power source or powered by harvesting power from the Tag Transceiver with Location Marker Programmer 46 during programming and from the mobile monitoring and display system 50 (FIG. 2) during the tracking phase, as discussed below.

Figure 6:
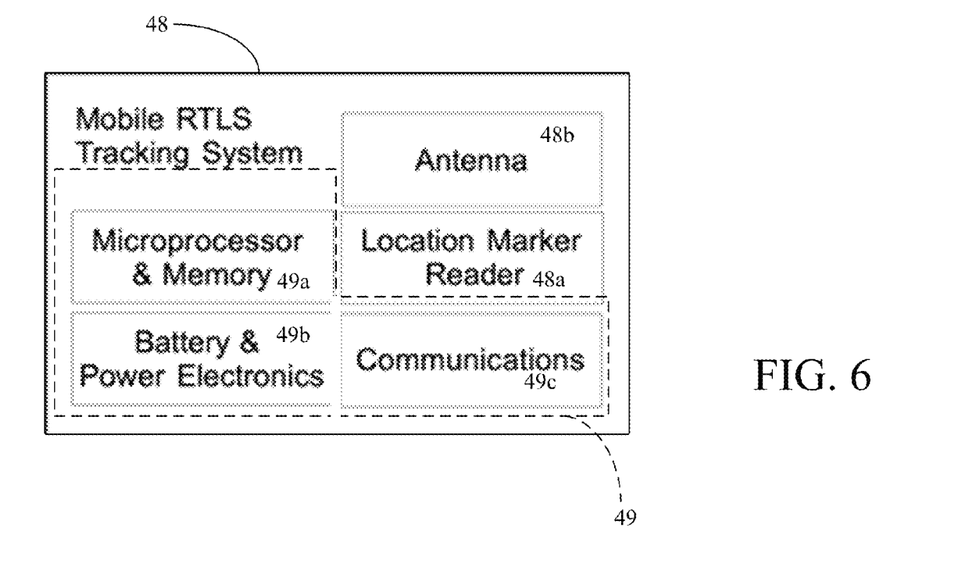

Referring to FIG. 6, a mobile tracking system 48 is carried by a user and is used to read location information from nearby location markers 46 that are placed around a site. The mobile tracking system 48 communicates the geo coordinates and/or the user-friendly location information to the mobile monitoring and display system 50 during the tracking phase of operation. The mobile tracking system 48 includes a location marker reader 48a that reads information from location markers 46 during the tracking phase of operation, an antenna 48b that facilitates communication with the Location markers 46 and circuitry 49 including a microprocessor and memory 49a that controls the operation of the individual components of the mobile tracking system 48. Also included in the circuitry 49 are a battery and power electronic block 49b that provides power to the system 48 and a communications block 49c that provides a communication channel between the mobile tracking system 48 and the mobile monitoring and display system 50.

Figure 7:
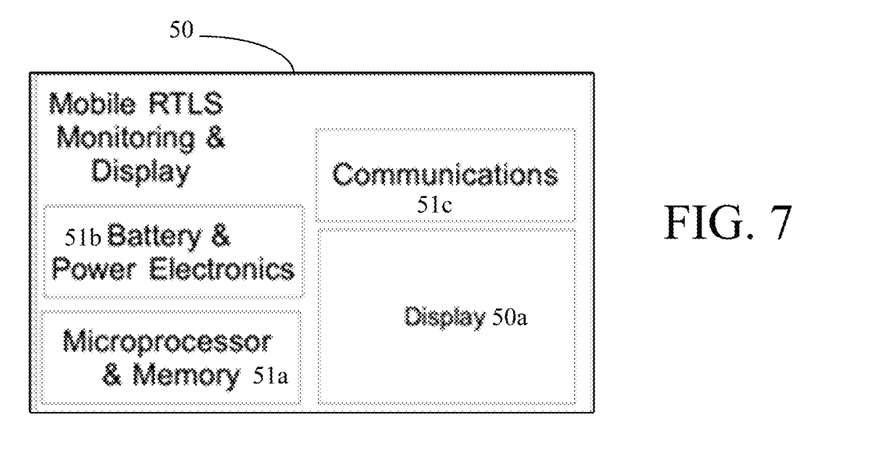

Referring to FIG. 7, a mobile monitoring and display system 50 displays the status and geo coordinates and/or user friendly location of one or more mobile tracking systems on a display which may also display maps or floor plans of a site or building. The mobile monitoring and display system 50 includes a display 50a that communicates visual and/or audible information about the geo coordinates and/or the user-friendly location information of the mobile tracking systems 48 that are associated with the mobile monitoring and display system 50. The mobile monitoring and display system 50 also includes a microprocessor and memory 51a that controls the functionality of the mobile monitoring and display system 50 and battery and power electronics 51b that provides power to operate the mobile monitoring and display system 50 and a communications block 51c that provides a communication channel to one or more mobile tracking systems that are associated with this mobile monitoring and display system 50.

Description of the System Operation

The Deployment and Setup Phase of Operation

Setting up the system 40 involves setting up several Positioning Transceiver System elements 42 around a site or building that is to be so equipped. Each of these elements is placed in a known geographic location or in a location where a geographic position receiver system such as GPS would have ability to accurately determine their geo coordinates. The Positioning Transceiver Elements are placed in locations that would be within range of the areas of the site or building to be surveyed and equipped with location markers 46.

Once the positioning transceiver system 42 are placed throughout the site, a user begins a survey by taking a tag transceiver with location marker programmer 44 to various locations around the site that are to be tagged with location markers 46. Typically the location markers 46 will be placed in locations such as hallways, doorways, elevators, stairways and other choke points where traffic will move during the tracking phase of operation. When a location is found to place a location marker, the tag transceiver with location marker programmer 44 determines the geo coordinates of that location and/or the user enters a user-friendly name (such as "Northwest Stairway, $2^{nd}$ Floor") into the tag transceiver with location marker programmer 44. The location marker 46 is programmed with the geo location and/or the user-friendly name of the location and the location marker 46 is affixed to the building or site in that location. The information can include the type of asset, e.g., smoke detector, exit sign, an id of the asset, the geo coordinates, location in the premises. This process is repeated in each location around the site or building so that the building or site has adequate coverage to allow tracking during the tracking phase of operation.

Figure 8:
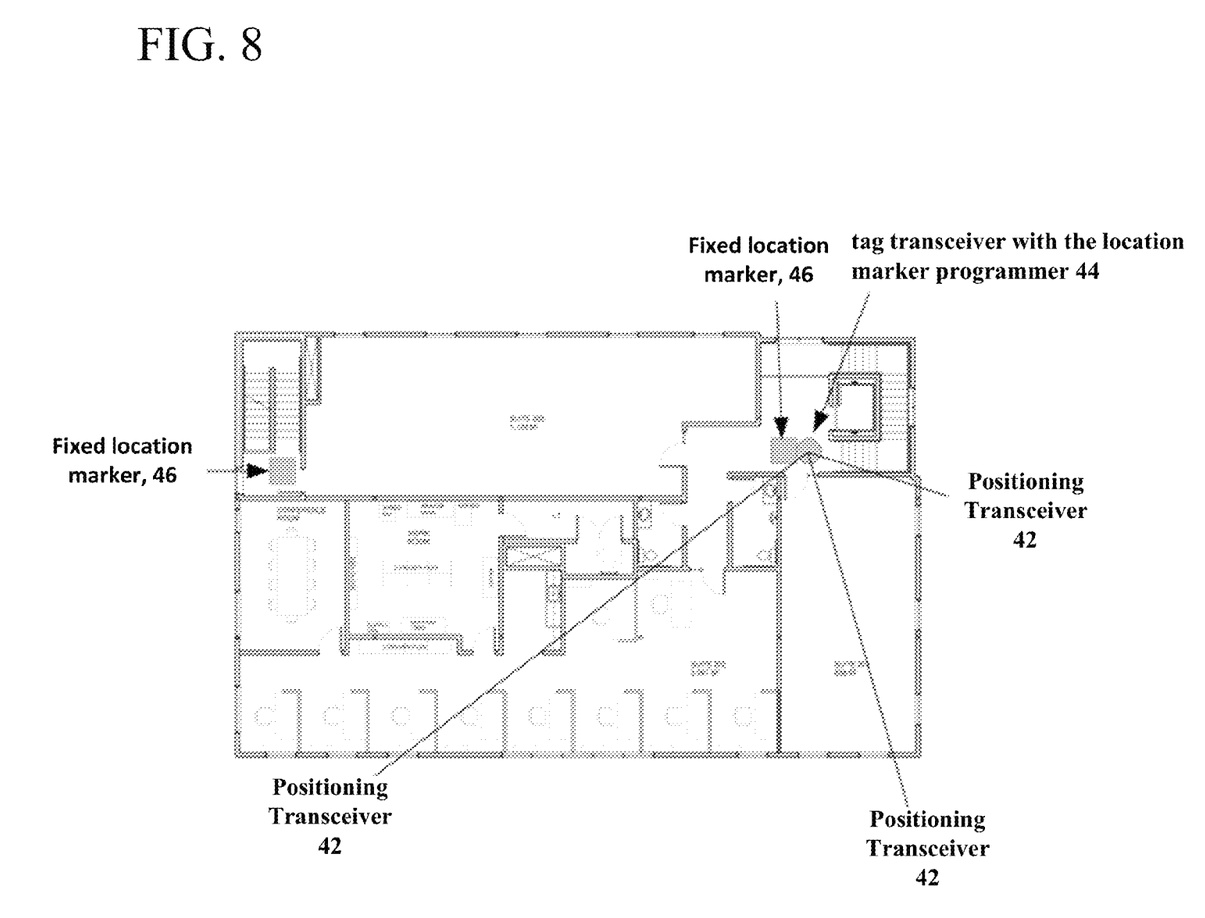
FIG. 8 is an exemplary layout plan useful in understanding setup.

Referring now to FIG. 8 a typical example of the programming of location markers 46 during the deployment phase of operation is shown. In this case there are 3 Positioning Transceivers 42 that are placed in 3 locations outside of the building. Two location markers 46 are shown with both geo coordinates and user-friendly location names. The location marker 46 (right side of the diagram) is being programmed by the tag transceiver with the location marker programmer 44b.

In the event that it is impractical or otherwise undesirable to determine the geo coordinates of the various location markers 46 around the site or building, the tags can be programmed with just the user-friendly location information. Even without the geo coordinates, the friendly location name provides significant value for tracking the location during the tracking phase of operation.

Figure 9:
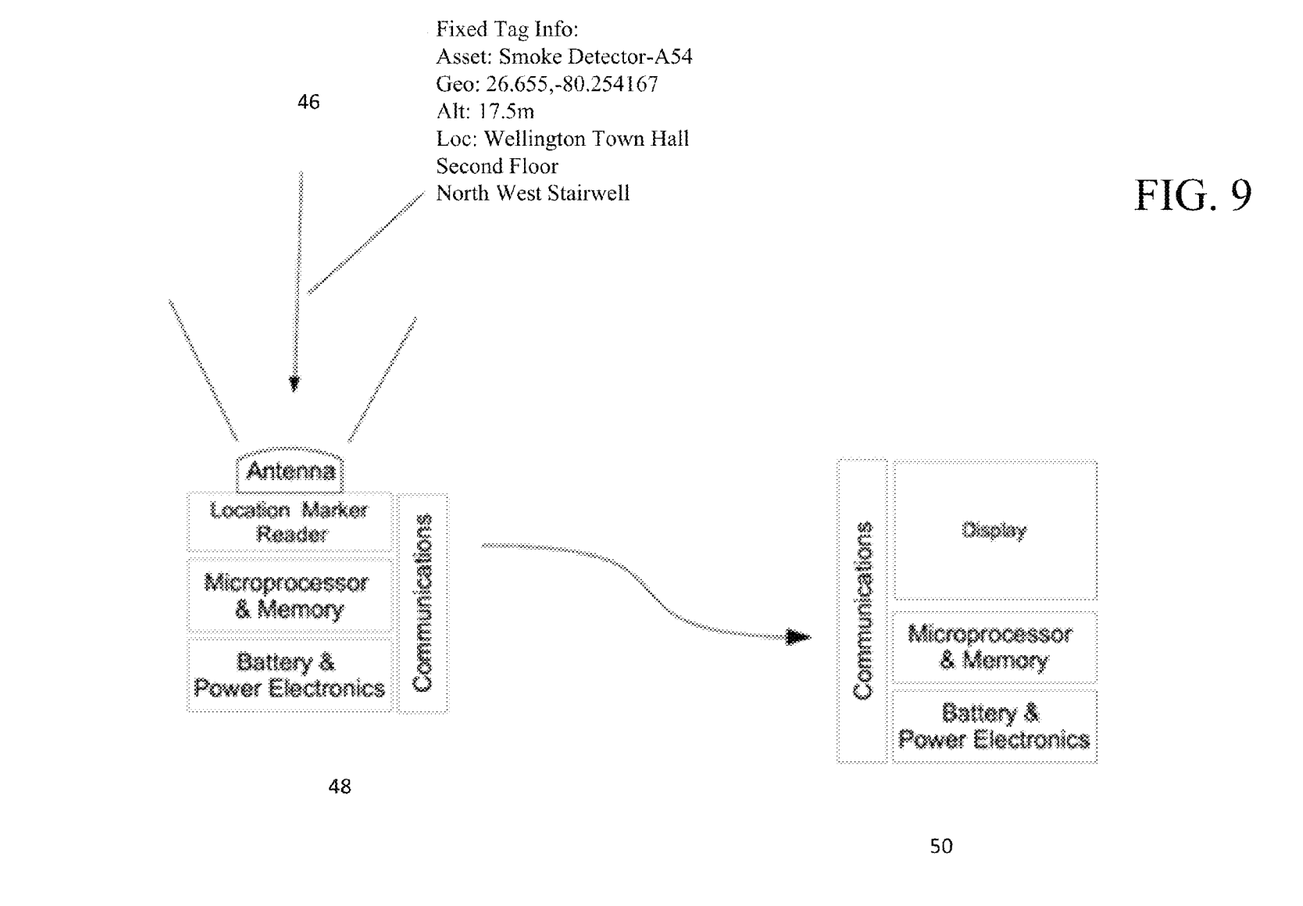
FIGS. 9-12 are diagrams useful in understanding setup and operation of the RTL system of FIG. 2.

The Tracking Phase of Operation:

Referring now to FIG. 9, during the tracking phase of operation, the mobile tracking system 48 is deployed into the site usually affixed to a person or high value asset that is being tracked. As the mobile tracking system 48 moves around the site, the mobile tracking system 48 moves near various location markers 46 that are located around the building or site. As the mobile tracking system 48 reads the various location markers, the mobile tracking system 48 produces a record of the time that the location marker 46 was read and the geo coordinate information and the user-friendly location name on each of the location markers 46. This information is communicated over a communication channel to the mobile monitoring and display system 50. In some cases, more than one mobile tracking system 48 may be deployed to a site or building that may be individually displayed on the Mobile Monitoring and Display System 50.

Figure 10A:
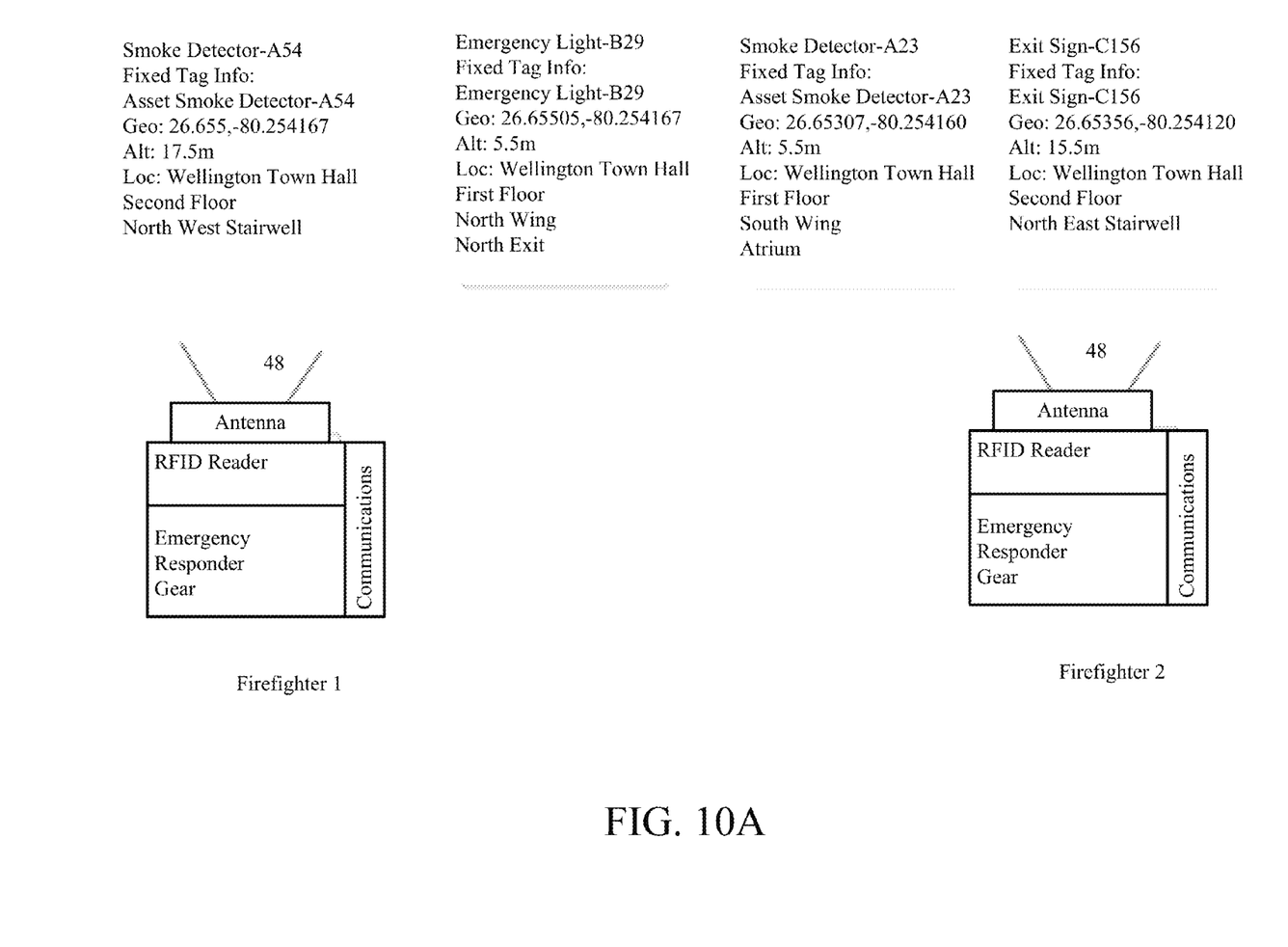
Figure 10B:
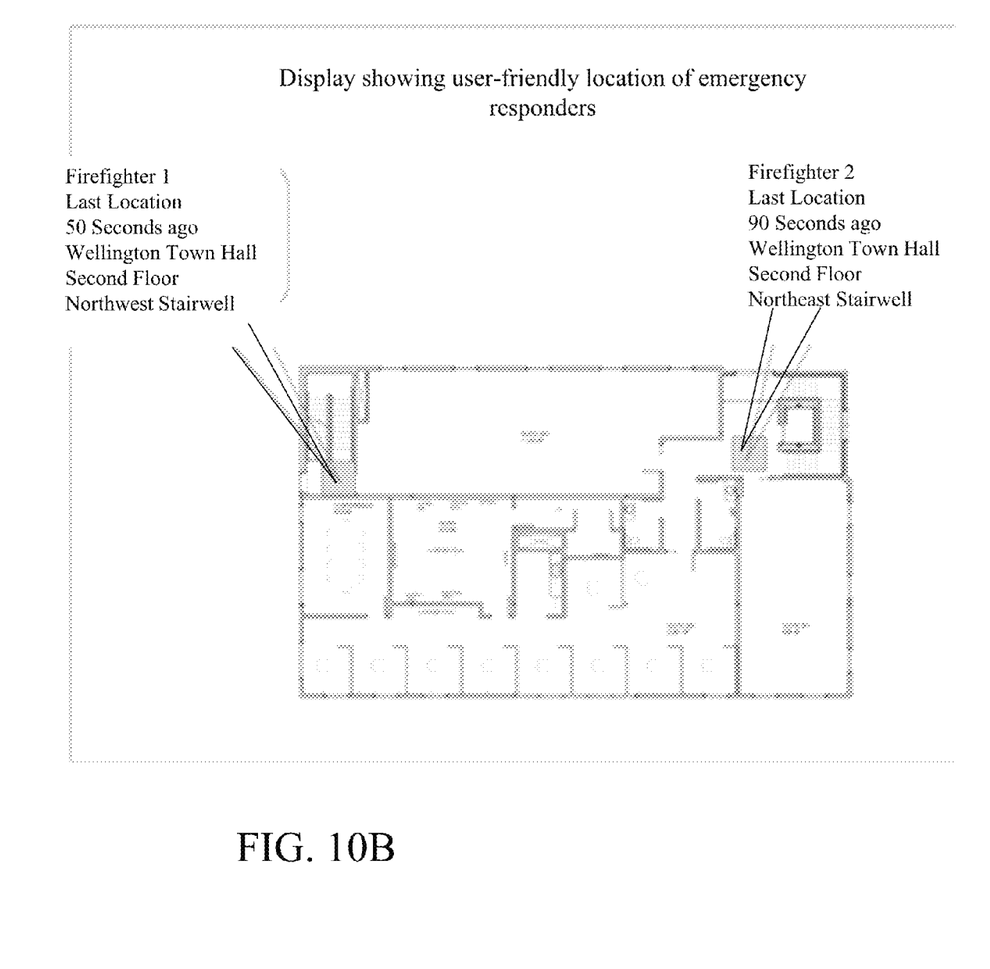

Referring now to FIGS. 10A and 10B, a potential use case with emergency personnel carrying a mobile tracking system 48 as part of their gear is shown. In this example, there are 2 firefighters that are located in two different locations around the building. In this example, the mobile monitoring and display system 50 (FIG. 10B) displays just the friendly name of the last known location of the firefighters and how long ago they were at that location.

Figure 11:
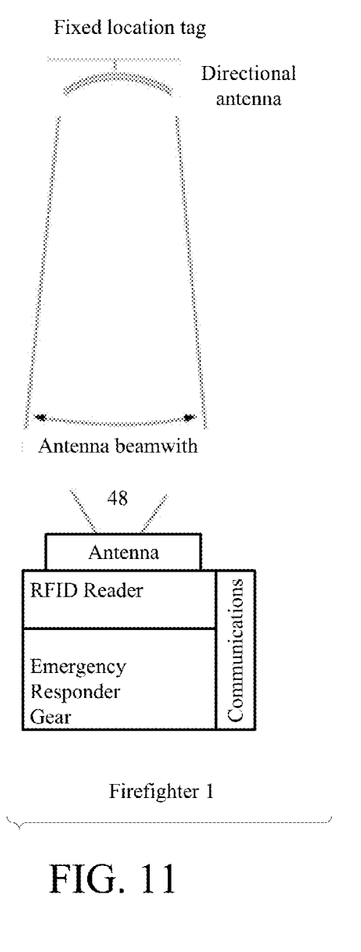
Figure 12:
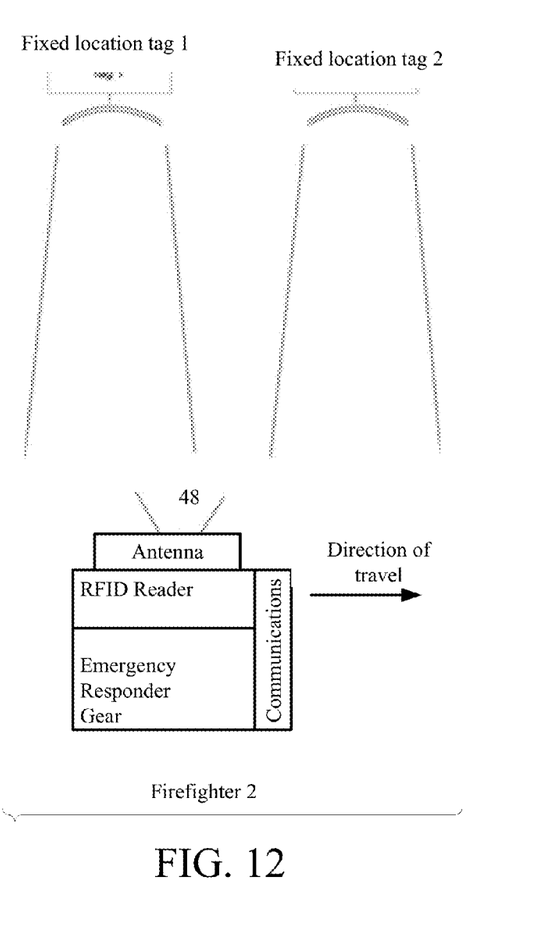

The mobile tracking system 48 uses location markers (not shown) that may have significant over range of operation allowing the location markers to be read from a large distance away, which could pose a problem. There are several approaches to manage that over-range: The power in the location marker reader may be adjusted down to read only a short distance. The antenna size in the location marker and/or the location marker reader may be configured to minimize over-range. The location marker may be configured with a narrow beam antenna that could be directed at a specific region to narrow the read-zone and reduce the over-range as shown in FIG. 11. Also as shown in FIG. 12, two location markers 46 with narrow beam antennas may be placed nearby one another which could provide direction of motion and the speed of the mobile tracking system 48 as it passes within range of both location markers 46. The location marker 46 can contain accuracy information that allows the zone of presence around the location marker 46 to be displayed along with the location information. The location marker 46 may store information using encryption techniques that allow only authorized users to read the information.

The location tracking system 40 may be implemented using any appropriate type of computing device, such as a mainframe work station, a personal computer, a server, a portable computing device, or any other type of intelligent device capable of executing instructions, connecting to a network, and forwarding data packets through the network and can execute any appropriate computer programs to generate, receive, and transmit data packets for use on the network.

Each of processes discussed above may be stored on one or more non-transitory machine-readable media, such as computer memory persistent or non-persistent to store executable instructions. Each of these devices may also include one or more processing devices (e.g., microprocessors, programmable logic, application-specific integrated circuits, and so forth) for executing the instructions to perform all or part of the functions described herein.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

Example Application

An example, non-limiting application of the WSN is in a security system for intrusion detection, fire, toxic gas, monitor, etc. installed at one or more premises such as one or more residential houses or building(s) and especially in, e.g., commercial, industrial, buildings, complexes, etc.

Figure 13:
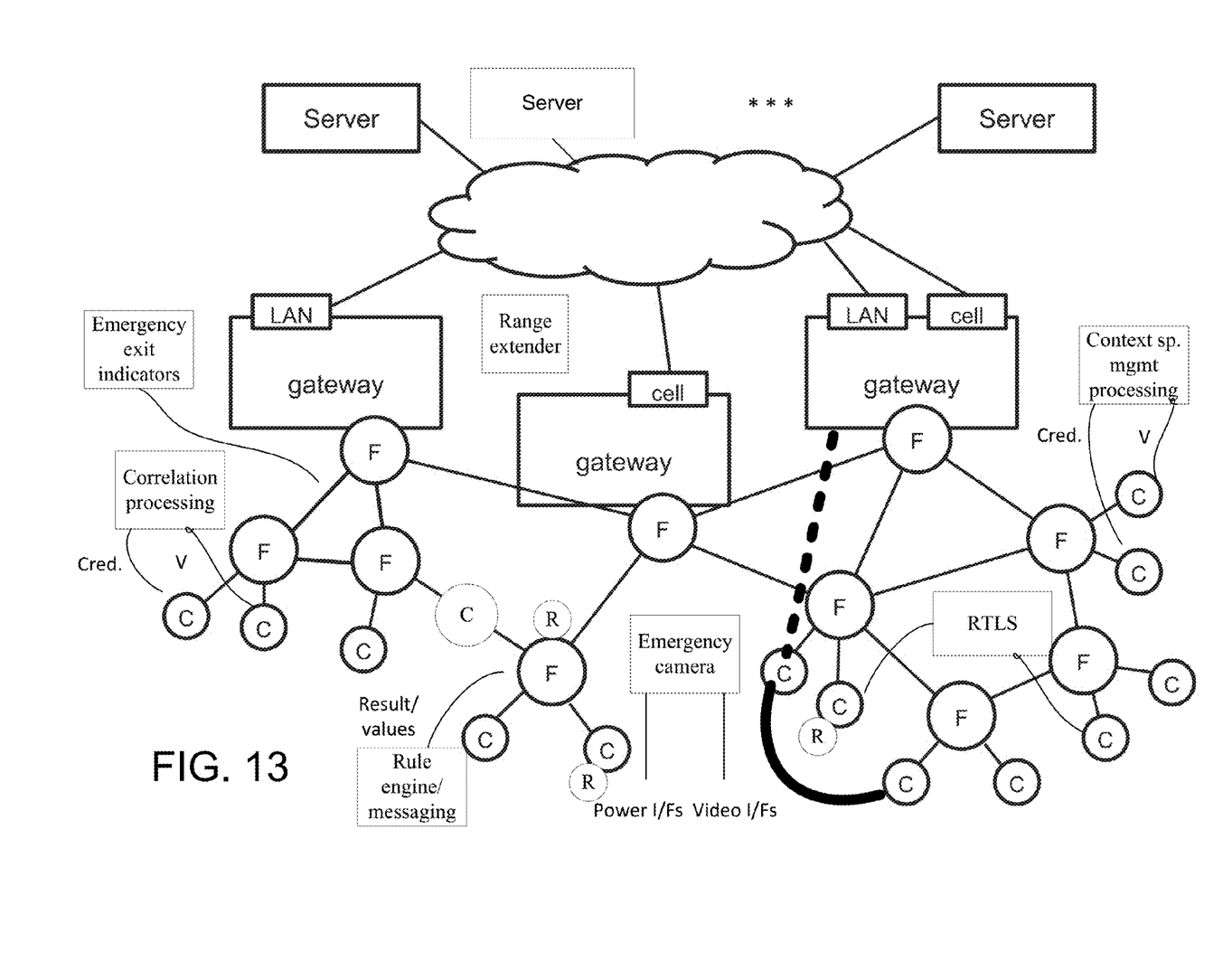
FIG. 13 is a block diagram of an example sensor network for physical premises security applications.

FIG. 13 shows an example of a security system having features of the WSN described with respect to FIG. 1 and having the various functionalities described herein. As shown in FIG. 13, correlation processing receives inputs from certain constrained nodes (although these can also be fully functional nodes). These inputs may include credential information and video information, and the correlation processing may produce correlated results that are sent over the network. Context management processing receives inputs from certain constrained nodes (although these can also be fully functional nodes) e.g., credential information and video and grouping information, and performs context processing with results sent over the network. The network supports operation of emergency exit indicators; emergency cameras as well as distributed rule processing and rule engine/messaging processing. Range extenders are used with e.g., gateways, and a real time location system receives inputs from various sensors (e.g., constrained type) as shown. Servers interface to the WSN via a cloud computing configuration and parts of some networks can be run as sub-nets.

The sensors provide in addition to an indication that something is detected in an area within the range of the sensors, detailed additional information that can be used to evaluate what that indication may be without the intrusion detection panel being required to perform extensive analysis of inputs to the particular sensor.

For example, a motion detector could be configured to analyze the heat signature of a warm body moving in a room to determine if the body is that of a human or a pet. Results of that analysis would be a message or data that conveys information about the body detected. Various sensors thus are used to sense sound, motion, vibration, pressure, heat, images, and so forth, in an appropriate combination to detect a true or verified alarm condition at the intrusion detection panel.

Recognition software can be used to discriminate between objects that are a human and objects that are an animal; further facial recognition software can be built into video cameras and used to verify that the perimeter intrusion was the result of a recognized, authorized individual. Such video cameras would comprise a processor and memory and the recognition software to process inputs (captured images) by the camera and produce the metadata to convey information regarding recognition or lack of recognition of an individual captured by the video camera. The processing could also alternatively or in addition include information regarding characteristic of the individual in the area captured/monitored by the video camera. Thus, depending on the circumstances, the information would be either metadata received from enhanced motion detectors and video cameras that performed enhanced analysis on inputs to the sensor that gives characteristics of the perimeter intrusion or a metadata resulting from very complex processing that seeks to establish recognition of the object.

Sensor devices can integrate multiple sensors to generate more complex outputs so that the intrusion detection panel can utilize its processing capabilities to execute algorithms that analyze the environment by building virtual images or signatures of the environment to make an intelligent decision about the validity of a breach.

Memory stores program instructions and data used by the processor of the intrusion detection panel. The memory may be a suitable combination of random access memory and read-only memory, and may host suitable program instructions (e.g. firmware or operating software), and configuration and operating data and may be organized as a file system or otherwise. The stored program instruction may include one or more authentication processes for authenticating one or more users. The program instructions stored in the memory of the panel may further store software components allowing network communications and establishment of connections to the data network. The software components may, for example, include an internet protocol (IP) stack, as well as driver components for the various interfaces, including the interfaces and the keypad. Other software components suitable for establishing a connection and communicating across network will be apparent to those of ordinary skill.

Program instructions stored in the memory, along with configuration data may control overall operation of the panel.

The monitoring server includes one or more processing devices (e.g., microprocessors), a network interface and a memory (all not illustrated). The monitoring server may physically take the form of a rack mounted card and may be in communication with one or more operator terminals (not shown). An example monitoring server is a SURGARD™ SG-System III Virtual, or similar system.

The processor of each monitoring server acts as a controller for each monitoring server, and is in communication with, and controls overall operation, of each server. The processor may include, or be in communication with, the memory that stores processor executable instructions controlling the overall operation of the monitoring server. Suitable software enable each monitoring server to receive alarms and cause appropriate actions to occur. Software may include a suitable Internet protocol (IP) stack and applications/clients.

Each monitoring server of the central monitoring station may be associated with an IP address and port(s) by which it communicates with the control panels and/or the user devices to handle alarm events, etc. The monitoring server address may be static, and thus always identify a particular one of monitoring server to the intrusion detection panels. Alternatively, dynamic addresses could be used, and associated with static domain names, resolved through a domain name service.

The network interface card interfaces with the network to receive incoming signals, and may for example take the form of an Ethernet network interface card (NIC). The servers may be computers, thin-clients, or the like, to which received data representative of an alarm event is passed for handling by human operators. The monitoring station may further include, or have access to, a subscriber database that includes a database under control of a database engine. The database may contain entries corresponding to the various subscriber devices/processes to panels like the panel that are serviced by the monitoring station.

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks;

magneto-optical disks; and CD-ROM and DVD-ROM disks and volatile computer memory, e.g., RAM such as static and dynamic RAM, as well as erasable memory, e.g., flash memory.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A real-time location system comprises:
    a plurality of positioning transceiver systems configured to determine geo-positions of the positioning transceiver systems relative to a global coordinate system, during set up of the real-time location system;
    a tag transceiver with location marker programmer that determines locations of the tag transceiver relative to the global positioning coordinate system, with the tag transceiver configured to program location markers with location information based on the determined locations; and
    a plurality of location markers programmed by the tag transceiver with location marker programmer, with the plurality of location markers programmed with location information of the locations that the location markers are affixed to around a site.

2. The real-time location system of claim 1 further comprising:
    a mobile tracking system to read location information from nearby location markers that are placed around the site.

3. The real-time location system of claim 1 further comprising:
    a mobile monitoring and display system, the mobile monitoring and display system configured to receive signals from the mobile tracking system; and comprising:
        a microprocessor and memory that controls the mobile monitoring and display system to display status and geo coordinates of a mobile tracking system.

4. The real-time location system of claim 2 wherein the location markers are read by the mobile tracking system, and the mobile tracking system stores for a location marker, a record of a time that the location marker was read and geo coordinate information and/or a user-friendly location name associated with the location marker.

5. The real-time location system of claim 1 wherein the plural positioning transceiver systems are placed throughout the site.

6. The real-time location system of claim 1 wherein the location information is geo coordinate information and/or user-friendly location information.

7. The real-time location system of claim 6 wherein the location markers comprise:
    a circuitry including a processor and memory that controls the location marker and is configured to be programmed with the geo coordinate information and/or the user-friendly location information;
    an antenna; and
    a communication circuitry coupled to the antenna and the circuitry including the microprocessor for communication of the geo coordinate information and/or the user-friendly location information.

8. The real-time location system of claim 2 wherein the mobile tracking system further comprises:
    a location marker reader that reads information from location markers during a tracking phase of operation of the real-time location system; an antenna;
    a circuitry including a microprocessor and memory that controls the operation of the mobile tracking system; and
    a communication circuitry coupled to the antenna and the circuitry including the microprocessor to communicate with the location markers.

9. The real-time location system of claim 1 wherein the plurality of positioning transceiver systems further comprises:
    a positioning element to determine distance or angle from the positioning element to a traditional tag that is used with a traditional real-time location tracking system that has position information for each of the locating elements, which information is fixed at known locations or determined at setup time;
    a global positioning transceiver; and
    a circuitry including a microprocessor and memory subsystem to control the positioning transceiver system and for communication of data to a tagging transceiver with location marker programmer.

10. The real-time location system of claim 1 wherein the tag transceiver with location marker programmer further comprises:
    a tag element to determine the location of the tag transceiver with location marker programmer, relative to the global positioning coordinates, and a location marker programmer to program the location markers with the global positioning coordinates and with the location marker programmer further configured to program the location markers with a user-friendly location information.

11. A real-time location system comprises:
    a plurality of positioning transceiver systems, configured to determine positions of the plurality of positioning transceiver systems relative to a global coordinate system during setup of the real-time location system;
    a plurality of location markers that are programmed by a tag transceiver with location marker programmer, with location information of locations that the location markers that are disposed around a site, and with the tag transceiver with location marker programmer, configured to determine the location information from the plurality of positioning transceiver systems;
    a mobile tracking system to read the location information from nearby ones of the location markers disposed around the site;
    a mobile monitoring and display system, the mobile monitoring and display system configured to receive signals from the mobile tracking system, and comprising:
        a microprocessor and memory that control the mobile monitoring and display system to display status and geo coordinates of the mobile tracking system.

12. The real-time location system of claim 11 wherein the location markers are read by the mobile tracking system, and the mobile tracking system stores for a location marker, a record of a time that the location marker was read and geo coordinate information and/or user-friendly location name associated with the location marker.

13. The real-time location system of claim 11 wherein the location information is geo coordinate information and/or user-friendly location information.

14. A method of real-time location tracking, the method comprising:
deploying a plurality of positioning transceiver systems configured to determine for each positioning transceiver system, its corresponding position, relative to a global coordinate system, during set up of the real-time location tracking;
determining by a tag transceiver with location marker programmer, location of the tag transceiver relative to the global position coordinate system from the plurality of positioning transceiver systems and to program location markers with location information;
deploying a plurality of location markers programmed by the tag transceiver with location marker programmer with location information of locations to which the location markers are deployed around a site;
deploying a mobile tracking system to read location information from nearby location markers that are deployed around the site;
receiving by a mobile monitoring and display system signals from the mobile tracking system to display status and geo coordinates of the mobile tracking system.

15. The real-time location system of claim 11 wherein the mobile tracking system further comprises:
a location marker reader that reads information from the location markers during tracking phase of operation;
an antenna;
a circuitry including a microprocessor and memory that controls the operation of the mobile tracking system; and
a communication circuitry coupled to the antenna and the circuitry including the microprocessor to communicate with the location markers.

16. The real-time location system of claim 11 wherein each of the location markers comprise:
a circuitry including a processor and memory that controls the location marker and is configured to be programmed with the geo coordinates and/or a-user friendly location information;
an antenna; and
a communication circuitry coupled to the antenna and the circuitry including the microprocessor for communication of the location information.

17. The method of claim 14 further comprising:
reading by the mobile tracking system location information from nearby location markers that are placed around the site.

18. The method of claim 14 further comprising:
receiving by a mobile monitoring and display system signals from the mobile tracking system; and
displaying by the mobile monitor and display system status and geo coordinates of the mobile tracking system.

19. The method of claim 14 further comprising:
reading the location markers by the mobile tracking system;
storing by the mobile tracking system for a location marker, a record of a time that the location marker was read and geo coordinate information and/or a user-friendly location name associated with the location marker.

* * * * *